UNITED STATES PATENT OFFICE.

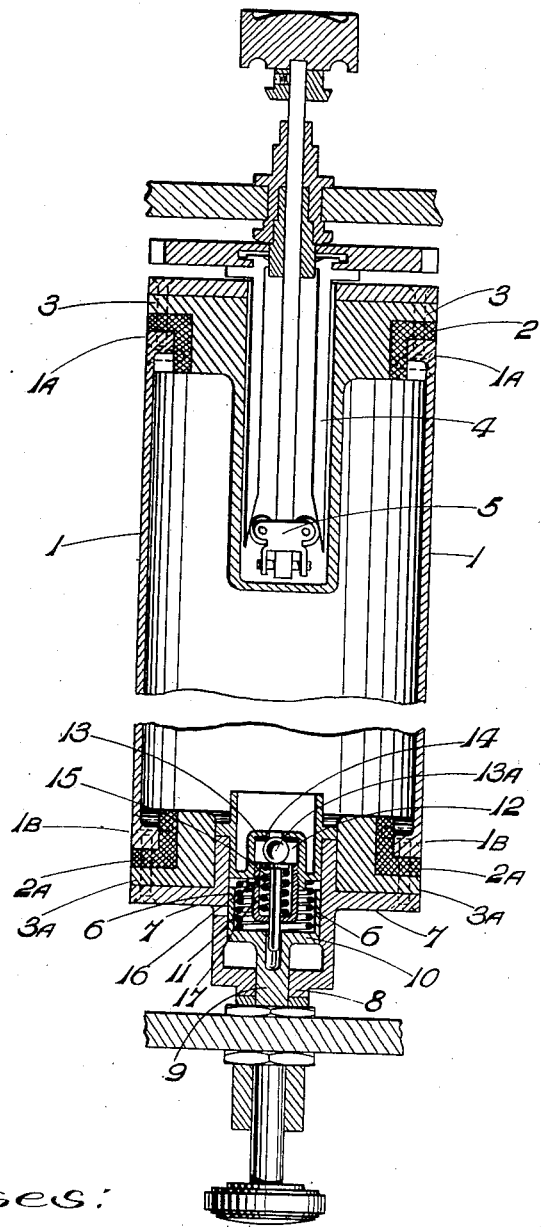

CONSTANCE MABEL MEREDITH HOUSTON, OF PAPANUI, CHRISTCHURCH, NEW ZEALAND.

TYPEWRITING-MACHINE.

1,347,333. Specification of Letters Patent. Patented July 20, 1920.

Application filed February 10, 1919. Serial No. 276,143.

*To all whom it may concern:*

Be it known that I, CONSTANCE MABEL MEREDITH HOUSTON, a subject of King George V of Great Britain, residing at Papanui, Christchurch, New Zealand, have invented certain new and useful Improvements in Typewriting-Machines, of which the following is a specification.

The object of the invention is to produce an approximately noiseless typewriter.

I accomplish the object by creating a vacuum in the core of a cylindrical platen of a typewriter, and by introducing apparatus forming a subsidiary part of the said platen, to maintain the vacuum.

The drawing accompanying this specification is a longitudinal section of the cylindrical platen of a typewriting machine showing a form of apparatus to maintain the vacuum in the said platen.

The cylinder 1 forming the principal member of the platen is preferably made from an aluminium alloy and is mounted upon insulated ends in the manner shown, comprising vulcanized rings 2 and 2^A firmly fitted between ends 3 and 3^A of the cylinder of any suitable material, and the ends 1^A and 1^B of the cylinder 1.

In the type of cylindrical platen illustrated in the drawing, one of the ends 3 is fashioned to form a pocket 4 wherein a variable line spacer mechanism 5 is housed; the other end 3^A is fashioned to form a facing piece whereon the vacuum pump fitting to maintain the vacuum in the cylindrical platen, is mounted. The pump fitting comprises the pump barrel 6, a flange 7 provided for the purpose of fixing the said pump fitting to the end 3^A and a bearing part 8 projected to form a support for a plunger rod 9; the plunger 10 is attached to the plunger rod 9 and is held normally at the end of the exhaust stroke of the plunger under the influence of the spring 11.

A valve casing 13 is mounted to the inner end of the pump barrel 6 and comprises a fitting 12 adapted to contain a ball valve 13^A and seat 14; the valve is held normally against its seat by the spring 15, the tension of which may be adjusted by any suitable means. Suitable ducts 16 are formed in the cap piece 17 to communicate between the interior of the cylinder 1 and the pump.

In practice, the air within the cylindrical platen may be exhausted and a vacuum formed therein by any suitable known means and subsequently the vacuum may be maintained by the regular action of the hand pump attached to the platen which can be operated by the typist.

Having thus described my invention, what I claim as new and desire to secure by Letters Patent is:—

1. In a typewriting machine, a cylindrical platen having a substantially air-tight inner chamber, the interior of said chamber being exhausted so as to provide a partial vacuum therein.

2. In typewriting machines, a cylindrical platen, disk members closing the ends of said cylinder, non-conducting material interposed between the ends of said cylinder and said disk members and means connected to one of said end disk members to create a partial vacuum within said cylinder.

3. In typewriting machines, a cylindrical platen, disk members closing the ends of said cylinder, non-conducting means interposed between the ends of said cylinder and said disk members and an air pump mounted in one of said disk members whereby the air within the cylinder may be exhausted and a partial vacuum created.

4. In typewriting machines, a cylindrical platen, disk members closing the ends of said cylinder, non-conducting means interposed between the ends of said cylinder and said disk members and an air pump mounted in one of said disk members whereby the air within the cylinder may be exhausted and a partial vacuum created, said air pump comprising a spring-pressed ball valve and a spring-pressed plunger, substantially as described.

In testimony whereof I have hereunto set my hand in presence of two subscribing witnesses.

CONSTANCE MABEL MEREDITH HOUSTON.

Witnesses:
MABEL McLEEMAN,
ROBERT PARK, Jnr.